United States Patent Office 3,254,078
Patented May 31, 1966

---

3,254,078
PHTHALOYLPHENOTHIAZINE COMPOUNDS AND POLYESTER MATERIALS COLORED THEREWITH
James M. Straley and David J. Wallace, Kingsport, Tenn., assignors to Eastman Kodak Company, Rochester, N.Y., a corporation of New Jersey
No Drawing. Filed Dec. 12, 1961, Ser. No. 158,902
6 Claims. (Cl. 260—243)

This invention relates to new 7-hydroxyphthaloylphenothiazine compounds, their preparation and their application for the dyeing or coloring of linear polyesters having a melting point of at least 200° C., especially linear polyester textile materials.

For purposes of simplification the term polyester will be used hereinafter to refer to "a linear polyester having a melting point of at least 200° C."

We have discovered that the new 7-hydroxyphthalophenothiazine compounds having the formula:

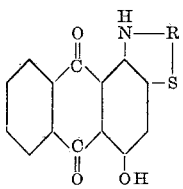

wherein R represents a monocyclic aryl nucleus of the benzene series joined to the nitrogen and sulfur atoms shown through adjacent carbon atoms and wherein said monocyclic aryl nucleus is free of an acid group selected from the group consisting of a sulfonic acid group and a carboxylic acid group are valuable dyestuffs for linear polyesters hvaing a melting point of at least 200° C., especially polyester textile materials in fiber, filament, yarn or cloth form, for example.

The new phthaloylphenothiazine compounds of our invention have excellent affinity for polyester textile materials and yield blue dyeings on these materials which have outstanding fastness to sublimation. The dyeings also have good fastness to light, washing and gas.

Fastness to sublimation is of real significance in the processing of polyester textile materials because they are frequently subjected to a so-called "heat-setting" operation. This operation is usually applied to polyester fabrics after dyeing. In this operation the fabrics are often heated to 375 to 400° F. and if a dye is not fast to sublimation some of it will sublime from the fabric and contaminate the equipment. Dyed polyester fibers are also often subjected to high temperatures during pleating and ironing.

Because dyed polyester fabrics are ordinarily subjected to processing involving high temperatures it is highly desirable that the dyes used to color them be resistant to changes during any high temperature processing, so that there will be no shade changes on the dyed polyester fabric and no contamination of any equipment or other goods with which the dyed polyester fabric may be used. Our new phthaloylphenothiazine dye compounds are very resistant to changes during high temperature processing.

Linear polyester fibers having a melting point of at least 200° C. include polyethylene terephthalate fibers sold on the market under the E. I. du Pont de Nemours and Company trademark "Dacron" and the polyester fibers sold on the market under the Eastman Kodak Company trademark "Kodel." The latter fibers are more particularly described in Kibler, Bell and Smith U.S. Patent 2,901,466. "Dacron" polyester fibers are described, for example, in Winfield and Dickens, U.S. Patent 2,465,319. The dyeing of other linear polyester fibers having a melting point of at least 200° C. in addition to those specifically mentioned is included within the scope of our invention.

The new phthaloylphenothiazine compounds of our invention can be readily prepared by condensing leucoquinizarin, quinizarin or a 2-haloquinizarin, such as 2-bromoquinizarin or 2-chloroquinizarin, for example, with o-aminobenzenethiol or its nuclear substituted derivatives, other than the sulfonic acid and the carboxylic acid derivatives. Our new phthaloylphenothiazine compounds can also be prepared by reacting a 1-arylamino-4-hydroxyanthraquinone, wherein the aryl nucleus of the arylamino group is a monocyclic aryl nucleus of the benzene series free of a sulfonic acid acid group or a carboxylic acid group, with sulfur monochloride.

Illustrative of the o-aminobenzenethiol compounds that can be employed are:

o-aminobenzenethiol,
2-amino-5-methoxybenzenethiol,
2-amino-5-ethoxybenzenethiol,
2-amino-5-β-hydroxyethylbenzenethiol,
2-amino-5-γ-hydroxypropylbenzenethiol,
2-amino-5-(β-hydroxyethylthio)benzenethiol,
2-amino-3-methyl-5-chlorobenzenethiol,
2-amino-5-methylsulfonylbenzenethiol,
2-amino-5-ethylsulfonylbenzenethiol,
2-aminobenzenethiol-5-N-methylsulfonamide,
2-aminobenzenethiol-5-N-ethylsulfonamide,
2-amino-5-cyanobenzenethiol,
2-amino-5-thiocyanobenzenethiol,
2-amino-5-chlorobenzenethiol,
2-amino-5-bromobenzenethiol,
2-amino-4,5-dichlorobenzenethiol,
2-amino-5,6-dichlorobenzenethiol and
2-amino-5-nitrobenzenethiol.

2-aminobenzenethiol compounds are known compounds. Any of the 2-aminobenzenethiol compounds disclosed herein which are not specifically disclosed in the prior art can be prepared by the methods used to prepare the known 2-aminobenzenethiol compounds. Substituted 2-aminobenzenethiol compounds can be prepared, for example, by treating a substituted 2-aminobenzothiazole or 2-aminobenzothiazathionium compound with an alkali such as NaOH or KOH, for example.

2-aminobenzothiazole compounds that can be used in preparing the 2-aminobenzenethiol compounds used in preparing the phthaloylphenothiazine compounds of our invention are disclosed in U.S. Patent 2,822,359. These 2-aminobenzothiazole compounds are illustrative and not limitative of the 2-aminobenzothiazole compounds that can be used to prepare 2-aminobenzenethiol compounds.

Dyeing is carried out in accordance with known methods for dyeing polyester textile materials. The methods disclosed in U.S. Patents 2,757,064 and 2,880,050, for example, can be used.

The phthaloylphenothiazine nucleus can be numbered as follows:

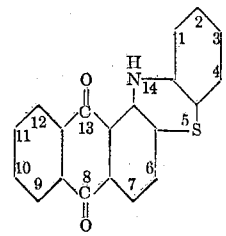

This numbering is employed by us.

The following examples illustrate our invention.

Example 1

5 grams of 2-bromoquinizarin and 20 cc. of o-aminobenzenethiol were heated together, with stirring, at 150° C. for 2 hours. The reaction mixture was allowed to cool overnight and the solid which precipitated was recovered by filtration and reslurried in 100 cc. of methyl alcohol. The slurry was filtered and the product obtained on the filter was washed with methyl alcohol and then dried at 110° C. 5.5 grams of 7-hydroxyphthaloylphenothiazine was recovered as a dark powder melting at about 256° C. It dyes polyester textile materials, such as Dacron and Kodel polyester fibers, beautiful greenish-blue shades having excellent fastness to sublimation and good fastness to light, washing and gas.

Example 2

42 grams of quinizarin, 26 grams of leucoquinizarin, 16 grams of boric acid, 0.5 gram of Igepon T

$(C_{17}H_{33}CON(CH_3)C_2H_4SO_3Na)$ and 500 cc. of isopropyl alcohol were stirred together and refluxed. A solution of 27 grams of o-aminobenzenethiol in 300 cc. of isopropyl alcohol were added over a period of about 15 minutes and the reaction mixture resulting was refluxed for 24 hours. The reaction mixture was cooled, 1000 cc. of water were added and then the reaction mixture was stirred for one hour. The reaction product was recovered by filtration, washed with water, reslurried in 6000 cc. of 7% aqueous NaOH, brought to the boil and held at the boil for 5 minutes. The reaction mixture was filtered while hot and the product recovered on the filter was washed with hot water until the filtrate came through colorless. The product collected on the filter was reslurried in 1000 cc. of 10% aqueous HCl, filtered and washed acid-free with water. 72 grams of 7 - hydroxyphthaloylphenothiazine were obtained. This reaction product is the same as that described in Example 1 and has the same dyeing properties.

Example 3

2.1 grams of quinizarin, 1.3 grams of leucoquinizarin, 0.8 gram of boric acid, 0.05 gram of Igepon T, 2.33 grams of 2-amino-5-methoxybenzenethiol hydrochloride, 1.6 grams of anhydrous potassium acetate and 55 cc. of isopropyl alcohol were refluxed together, with stirring, for 24 hours. The reaction product was cooled, 50 cc. of water were added and then the reaction mixture was stirred for one hour. The reaction product was recovered by filtration, washed with water, reslurried in 300 cc. of 7% aqueous NaOH, brought to the boil and held at the boil for 5 minutes. The reaction mixture resulting was filtered and the product recovered on the filter was washed well with water and then slurried in 50 cc. of 10% aqueous HCl. The resulting mixture was filtered and the product which was recovered on the filter was washed acid-free with water and dried. 3-methoxy-7-hydroxyphthaloylphenothiazine was thus obtained. It dyes polyester textile materials, such as Dacron and Kodel polyester fibers, greenish-blue shades having excellent fastness to sublimation and good fastness to light, washing and gas.

Example 4

Example 3 was repeated, omitting the use of potassium acetate and using 2.7 grams of 5-β-hydroxyethyl-2-aminobenzenethiol in place of 2-amino-5-methoxybenzenethiol hydrochloride. 3 - β-hydroxyethyl-7-hydroxyphthaloylphenothiazine was obtained. It dyes polyester textile materials, such as Dacron and Kodel polyester fibers, greenish-blue shades having excellent fastness to sublimation and good fastness to light, washing and gas.

Example 5

Example 4 was repeated using 2.2 grams of 2-amino-3-methyl - 5 - chlorobenzenethiol in place of 5-β-hydroxyethyl - 2 - aminobenzenethiol. 1-methyl-3-chloro-7-hydroxyphthaloylphenothiazine was obtained. It dyes polyester textile materials, such as Dacron and Kodel polyester fibers, greenish-blue shades having excellent fastness to sublimation and good fastness to light, washing and gas.

Example 6

Example 4 was repeated using 2.3 grams of a mixture of 2 - amino - 4,5-dichlorobenethiol and 2-amino-5,6-dichlorobenzenethiol in place of 5 - β - hydroxyethyl-2-aminobenzenethiol. A mixture of 2,3-dichloro-7-hydroxyphthaloylphenothiazine and 3,4-dichloro-7-hydroxyphthaloylphenothiazine was obtained. This dye mixture dyes polyester textile materials, such as Dacron and Kodel polyester fibers, greenish-blue shades having excellent fastness to sublimation and good fastness to light, washing and gas.

Example 7

3.4 grams of leucoquinizarin, 0.8 gram of boric acid, 3.0 grams of 2-amino-5-(β-hydroxyethylthio)benzenethiol, 0.05 gram of Igepon T and 50 cc. of isopropyl alcohol were refluxed together, with stirring for 12 hours. Upon working up the reaction mixture in accordance with the procedure described in Example 3, 3-(β-hydroxyethylthio)-7 - hydroxyphthaloylphenothiazine was obtained. It dyes polyester textile materials, such as Dacron and Kodel polyester fibers, greenish-blue shades having excellent fastness to sublimation and good fastness to light, washing and sublimation.

Example 8

A mixture of 2.4 grams of quinizarin, 2 cc. of o-aminobenzenethiol and 20 cc. of isopropyl alcohol were refluxed together, with stirring, for 20 hours. After cooling to room temperature, the solid formed was collected on the filter by filtration and washed with isopropyl alcohol. The solid collected on the filter was slurried for 2 hours in dilute aqueous sodium hydroxide, recovered by filtration, washed well with water, and dried. The product obtained is identical to that of Example 1.

Example 9

A mixture of 3.15 grams of 1-anilino-4-hydroxyanthraquinone, 6.75 grams of sulfur monochloride and 10 cc. of nitrobenzene was heated, with stirring, on a steam bath for 24 hours. After cooling the reaction mixture was filtered and the product collected on the filter was washed well with methyl alcohol and dried. 7-hydroxyphthaloylphenothiazine was thus obtained. It dyes polyester textile materials, such as Dacron and Kodel polyester fibers, bright greenish-blue shades having excellent fastness to sublimation and good fastness to light washing and gas.

Other 1-arylamino-4-hydroxyanthraquinone compounds that can be used to prepare the new 7-hydroxyphthaloylphenothiazine compounds of our invention include, for example, 1-o-anisidino-4-hydroxyanthraquinone,
1-p-anisidino-4-hydroxyanthraquinone,
1-o-ethoxyphenylamino-4-hydroxyanthraquinone,
1-p-ethoxyphenylamino-4-hydroxyanthraquinone,
1-(o-β-hydroxyethyl)phenylamino-4-hydroxyanthraquinone,
1-(m-β-hydroxyethyl)phenylamino-4-hydroxyanthraquinone,
1-(p-β-hydroxyethyl)phenylamino-4-hydroxyanthraquinone,
1-o-methylolphenylamino-4-hydroxyanthraquinone,
1-m-methylolphenylamino-4-hydroxyanthraquinone,
1-(o-α-methylmethylol)phenylamino-4-hydroxyanthraquinone,
1-o-chloroanilino-4-hydroxyanthraquinone,
1-p-chloroanilino-4-hydroxyanthraquinone,
1-o-bromoanilino-4-hydroxyanthraquinone, 1-p-bromoanilino-4-hydroxyanthraquinone and 1-p-methylanilino-4-hydroxyanthraquinone.

Following the procedures given hereinbefore 3-ethoxy-7-hydroxyphthaloylphenothiazine,
3-γ-hydroxypropyl-7-hydroxyphthaloylphenothiazine,
3-methylsulfonyl-7-hydroxyphthaloylphenothiazine,
3-ethylsulfonyl-7-hydroxyphthaloylphenothiazine,
3-N-methylsulfonamido-7-hydroxyphthaloylphenothiazine,
3-N-ethylsulfonamido-7-hydroxyphthaloylphenothiazine,
3-cyano-7-hydroxyphthaloylphenothiazine,
3-thiocyano-7-hydroxyphthaloylphenothiazine,
3-bromo-7-hydroxyphthaloylphenothiazine,
and 3-nitro-7-hydroxyphthaloylphenothiazine, for example, are readily obtained.

By the use of 2.3 grams of 2-amino-4,5-dichlorobenzenethiol and 2.3 grams of 2-amino-5,6-dichlorobenzenethiol, respectively in place of 5-β-hydroxyethyl-2-aminobenzenethiol in Example 4, 2,3-dichloro-7-hydroxyphthaloylphenothiazine and 3,4-dichloro-7-hydroxyphthaloylphenothiazine, respectively, are obtained. Each of these dye compounds dye polyester textile materials, such as Dacron and Kodel polyester fibers, blue shades having excellent fastness to sublimation and good fastness to light, gas and washing.

*Example 10*

13.5 grams of 2-amino-6-β-hydroxyethylbenzothiazole, 8.2 grams of NaOH and 22.5 cc. of water were refluxed, with stirring, for 4 hours. The reaction mixture resulting was diluted at the boil with 35 cc. of water, filtered while hot, then cooled and neutralized by the addition of acetic acid. After standing for 48 hours, the reaction mixture was filtered and the product collected on the filter was washed well with water and air dried. 6.6 grams of 5-β-hydroxyethyl-2-aminobenzenethiol were thus obtained as a yellow solid.

*Example 11*

13.5 grams of a mixture of 2-amino-5,6-dichlorobenzenethiazole and 2-amino-6,7-dichlorobenzenethiazole were refluxed, with stirring for 7 hours in a solution of 8.2 grams of NaOH in 22.5 cc. of water. Upon working up the reaction mixture in accordance with the procedure described in Example 10, 8.1 grams of a mixture of 2-amino-4,5-dichlorobenzenethiol and 2-amino-5,6-dichlorobenzenethiol were obtained.

*Example 12*

By the use of an equivalent amount of 2-amino-6-β-hydroxyethylthiobenzothiazole in place of 2-amino-6-β-hydroxyethylbenzothiazole in Example 10, 6.1 grams of 2-amino-5-(β-hydroxyethylthio)benzenethiol were obtained as a yellow solid.

*Example 13*

0.1 gram of the dye of Example 1 was dissolved in the dye pot by warming in 5 cc. of ethylene glycol monomethyl ether. A 2% Igepon T and 0.5% sodium lignin sulfonate aqueous solution was added, with stirring, until a fine emulsion was obtained. Water was then slowly added to a total volume of 200 cc. 3 cc. of Dacronyx (a chlorinated benzene emulsion) were added and 5 grams of a textile fabric made of Kodel polyester fibers were entered. The fabric was worked 10 minutes without heat and then for 10 minutes at 80° C. The dyebath was then brought to the boil and held at the boil for one hour. Following this, the fabric was rinsed in warm water, then scoured in an aqueous 0.2% soap, 0.2% soda-ash solution. After scouring the fabric was rinsed with water and dried. The fabric was dyed a bright greenish-blue shade having excellent fastness to sublimation and good fastness to light, gas and washing.

A similar result is obtained when the fabric is made of Dacron polyester fibers.

Other dyestuff assistants (or carriers, as these assistants are sometimes called) such as o-phenylphenol, methyl salicylate and methyl terephthalate, for example, can be substituted for the chlorinated benzene emulsion employed in the foregoing example.

Example 13 is illustrative and not limitative of the manner in which polyester textile materials can be dyed.

The polyester materials can also be dyed under pressure with known techniques. Further, the polyester materials can also be dyed at an elevated temperature. When dyeing is carried out at an elevated temperature it may be carried out in accordance with the process described in U.S. Patent 2,663,612.

*Example 14.—Dry sublimation test*

A piece of dry dyed polyester fabric is placed between a swatch of cotton cloth and a swatch of multifiber test cloth (composed of stripes of wool, viscose, silk, nylon, cotton and cellulose acetate) and then placed between the plates of a Scorch Tester (Atlas Electric Devices Co.) at 350° F. for two minutes. Variations in time and temperature may be employed to determine differences between dyes. The fastness to sublimation is determined by loss of color from the dyed fabric and the degree of mark-off on the undyed fabrics.

Although the invention has been described in detail with particular reference to preferred embodiments thereof, it will be understood that variations and modifications can be effected within the spirit and scope of the invention as described hereinabove and as defined in the appended claims.

We claim:

1. The phthaloylphenothiazine compounds of the formula:

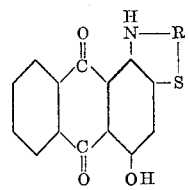

wherein R represents a phenylene radical joined to the nitrogen and sulfur atoms shown through adjacent carbon atoms and which radical is free of an acid group selected from the group consisting of a sulfonic acid group and a carboxylic acid group.

2. The phthaloylphenothiazine compound of the formula:

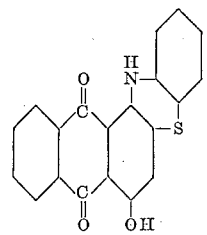

3. The phthaloylphenothiazine compound of the formula:

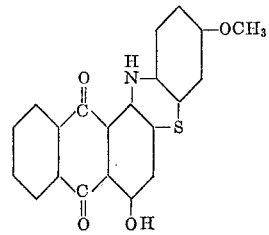

4. The phthaloylphenothiazine compound of the formula:

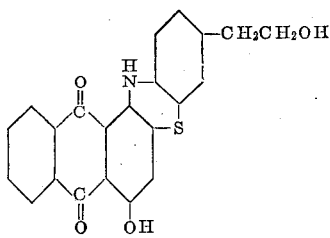

5. The phthaloylphenothiazine compound of the formula:

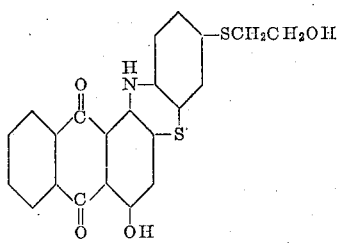

6. The phthaloylphenothiazine compound of the formula:

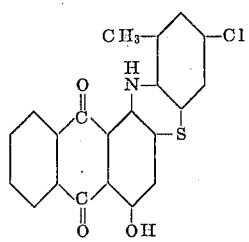

References Cited by the Examiner

UNITED STATES PATENTS

| | | | |
|---|---|---|---|
| 729,073 | 5/1903 | Kugel | 260—244 |
| 1,138,670 | 5/1915 | Kranzlein et al. | 260—244 |
| 2,698,324 | 12/1954 | Shmidl | 260—243 |
| 2,814,622 | 11/1957 | Moffett | 260—243 |
| 2,872,279 | 2/1959 | Wiseman | 8—55 |
| 2,880,050 | 3/1959 | Fortess et al. | 8—55 |

FOREIGN PATENTS

| | | |
|---|---|---|
| 427,969 | 4/1926 | Germany. |
| 14,970 | 5/1905 | Great Britain. |

OTHER REFERENCES

Beilsteins Handbuch der Organischen Chemie (I), vol. 27, page 284 (system No. 4298) and page 309 (system No. 4300), Verlag von Julius Springer, Berlin, Germany (1937).

Beilsteins Handbuch der Organischen Chemie (II), vol. 27, page 346 (system #4298) and page 370 (system #4300), Verlag Julius Springer, Berlin, Germany (1938).

Laube et al.: Ber. Deut. Chem., vol. 43, pages 1730 to 1734 (1910).

Lowy et al.: "An Introduction to Organic Chemistry," 6th Ed. page 213, John Wiley and Sons, Inc., New York (1945).

Ullmann et al.: Ber. Deut. Chem., vol. 49, pages 2154 to 2169 (1916).

Venkataraman: "The Chemistry of Synthetic Dyes," vol. 2, pages 1088, 1090, 1094, 1098 and 1105, Academic Press Inc., New York (1952).

JOHN D. RANDOLPH, *Acting Primary Examiner.*

MORRIS O. WOLK, NICHOLAS S. RIZZO, WALTER A. MODANCE, *Examiners.*

J. HERBERT, *Assistant Examiner.*